United States Patent [19]
Ryherd et al.

[11] Patent Number: 4,970,499

[45] Date of Patent: Nov. 13, 1990

[54] APPARATUS AND METHOD FOR PERFORMING DEPTH BUFFERING IN A THREE DIMENSIONAL DISPLAY

[75] Inventors: Eric L. Ryherd, Brookline, Mass.; Ross G. Werner, Woodside, Calif.; John G. Torborg, Jr., Carlisle, Mass.

[73] Assignee: Raster Technologies, Inc., Westford, Mass.

[21] Appl. No.: 222,529

[22] Filed: Jul. 21, 1988

[51] Int. Cl.$^5$ ............................................... G09G 1/16
[52] U.S. Cl. ..................................... 340/729; 340/799
[58] Field of Search ............... 340/799, 798, 747, 703, 340/729; 365/189.05, 189.12; 364/521, 522

[56] References Cited

U.S. PATENT DOCUMENTS

| | | | |
|---|---|---|---|
| 4,475,104 | 10/1984 | Shev | 340/729 |
| 4,562,435 | 12/1985 | McDonough et al. | 340/799 |
| 4,679,041 | 7/1987 | Fetter et al. | 340/729 |

Primary Examiner—Alvin E. Oberley
Attorney, Agent, or Firm—Hale and Dorr

[57] ABSTRACT

Disclosed is a three-dimensional display system that utilizes a host processor for performing geometric transformations and a local display processor for processing the user-supplied information which defines the object to be displayed. The display processor creates image data defining the location, color and intensity of each point of the overall image. This display processor processes and stores depth data which defines the corresponding depth relationships of the image points at each location of the overall image with the depth data being stored in a depth buffer, which is part of the display processor. The depth buffer is a two port memory device with one port being a random access port and the other being a serial access port. The display processor pipelines depth buffering operations by loading a row of data from the depth buffer into a shift register and then reading (a Read operation) the relevant pixel data through the serial access port which is connected to the shift register. The display processor then performs the Compare operation between the depth of the new pixel data and the depth of the old pixel data and if appropriate, will perform a Conditional Write operation of the new pixel data. The Write operation is performed through the random access port. As a result, the serial access port can continually be used for Read operations during each and every clock cycle, and the random access port can be used for Conditional Write operations during each consecutive clock cycle as well.

13 Claims, 3 Drawing Sheets

| PIPE STAGE 1 | READ Z 0 | READ Z 1 | READ Z 2 | READ Z 3 | READ Z 4 | READ Z 5 | |
|---|---|---|---|---|---|---|---|
| PIPE STAGE 2 | | COMPARE Z 0 | COMPARE Z 1 | COMPARE Z 2 | COMPARE Z 3 | COMPARE Z 4 | |
| PIPE STAGE 3 | | | CONDITIONAL WRITE 0 | CONDITIONAL WRITE 1 | CONDITIONAL WRITE 2 | CONDITIONAL WRITE 3 | etc. |
| | CLOCK 1 | CLOCK 2 | CLOCK 3 | CLOCK 4 | CLOCK 5 | CLOCK 6 | |

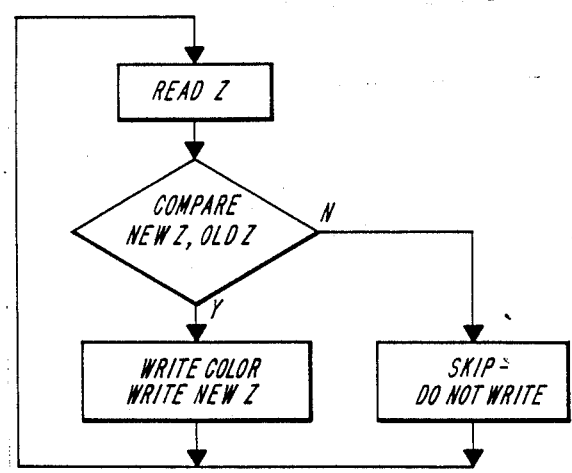
FIG. 1A
(PRIOR ART)
| 1st CLOCK CYCLE | 2nd CLOCK CYCLE | 3rd CLOCK CYCLE | 4th CLOCK CYCLE | 5th CLOCK CYCLE | 6th CLOCK CYCLE | |
|---|---|---|---|---|---|---|
| READ Z 0 | COMPARE 0 | CONDITIONAL WRITE 0 | READ Z 1 | COMPARE 1 | CONDITIONAL WRITE 1 | etc. |
FIG. 1B
(PRIOR ART)
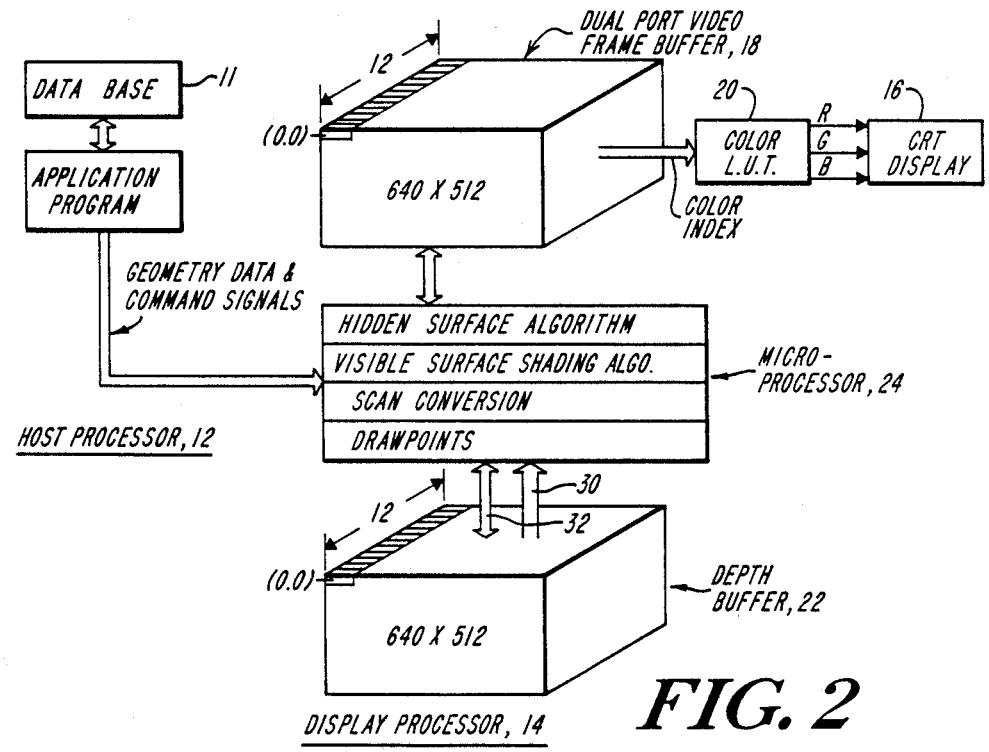
FIG. 2

APPARATUS AND METHOD FOR PERFORMING DEPTH BUFFERING IN A THREE DIMENSIONAL DISPLAY

BACKGROUND OF THE INVENTION

The present invention relates to a system and method for displaying three-dimensional images on a two-dimensional raster display screen using depth buffering and more particularly to a system and method for displaying three-dimensional images on a two-dimensional raster display screen by utilizing a serial access port of a two port dynamic random access memory device in depth buffering applications.

In systems providing three-dimensional representations of images on a two-dimensional display, it is generally necessary to eliminate hidden surfaces. Depth buffering is one common technique used to perform hidden surface removal of three-dimensional graphics primitives, and one such depth buffering system was described in U.S. Pat. No. 4,475,104 the disclosure of which is incorporated herein by reference.

In general, a depth buffer maintains a depth value for each pixel which may be displayed. Hidden surface removal is done by comparing the depth of each pixel being drawn with the depth of the pixel currently displayed at the location. If the new pixel is determined to be visible, then the pixel is written, and the depth value for that pixel in the depth buffer is updated.

In the system described in U.S. Pat. No. 4,475,104, a host processor supplies input information on the geometric elements (e.g. polygons), which make up the image to a local display processor which processes the input information and provides data concerning the location, color, intensity and depth of the points which make up the surfaces of the polygon. The depth data is stored in a depth buffer which is a part of the display processor, and the color and intensity data is also stored directly in a frame buffer or as color index data in the frame buffer which is used to address the desired color and intensity stored in a color look-up table.

This system was an improvement over known prior art systems insofar as in the prior art systems the host processor performs both the geometric transformation of the input data into an image to be displayed as well as hidden surface removal and shading. Once the host processor performed these two tasks in the prior art systems, the calculated information was then sent to the local display processor which caused the image to be displayed on a raster display screen on a line-by-line basis. A major disadvantage of this type of system was that the entire image had to be created and stored by the host processor before any data concerning the points defining the image could be supplied to the display processor. As a result, a user wishing to use information in a data base to display an image must wait for data defining the complete image to be duplicated in a non-displayable form at the host processor before it can be transferred to the display processor.

The system of U.S. Pat. No. 4,475,104 avoided these problems by requiring that the display processor process the intensity and color data as well as the depth data, leaving the host processor to perform only the geometry transformation functions. As a result, the overall image to be displayed is constructed incrementally and selected portions of the image can be displayed immediately at any location and in any order.

Referring to FIG. 1A, in performing the depth buffering operation, the local display processor performs the following steps:

1. Interpolate the pixel depth by adding the current pixel depth to the depth interpolate register.
2. Read the old pixel depth from the depth buffer.
3. Compare the old pixel depth with the current pixel depth.
4. Conditionally write the current pixel depth into the depth buffer if the current pixel is determined to be in front the old pixel depth.

As a result, the Read, Compare and Conditional Write steps require access to the I/0 part of the depth buffer for three separate and distinct clock cycles as shown in FIG. 1B. The processor performing the Compare operation is thus in use for no more than one third of the available processing time.

It is therefore a principal object of the present invention to provide an improved three dimensional display system utilizing a depth buffer that optimizes use of the local display processor.

Another object of the present invention is to provide an improved three dimensional display system utilizing a depth buffer that pipelines operations of the local display processor.

SUMMARY OF THE INVENTION

Accordingly, a three-dimensional display system is provided that utilizes a host processor for performing geometric transformations and a local display processor for processing the user-supplied information which defines the object to be displayed. The display processor creates image data defining the location, color and intensity of each point of the overall image. This display processor processes and stores depth data which defines the corresponding depth relationships of the image points at each location of the overall image with the depth data being stored in a depth buffer, which is part of the display processor. The depth buffer is a two port memory device with one port being a random access port and the other being a serial access port. The display processor pipelines depth buffering operations by loading a row of data from the depth buffer into a shift register and then reading (a Read operation) the relevant pixel data through the serial access port which is connected to the shift register. The display processor then performs the Compare operation between the depth of the new pixel data and the depth of the old pixel data and if appropriate, will perform a Conditional Write operation of the new pixel data. The Write operation is performed through the random access port. As a result, the serial access port can continually be used for Read operations during each and every clock cycle, and the random access port can be used for Conditional Write operations during each consecutive clock cycle as well.

These and other objects and features of the present invention will be more fully understood from the following detailed description which should be read in light of the accompanying drawings in which corresponding reference numerals refer to corresponding parts throughout the several views.

BRIEF DESCRIPTION OF THE DRAWINGS

FIG. 1A. is a simplified flow chart of a prior art depth buffer operation;

FIG. 1B is a graphical representation of the clock cycle utilization of a prior art depth buffer operations;

FIG. 2 is a block diagram of a system in accordance with the present invention;

DETAILED DESCRIPTION OF THE PREFERRED EMBODIMENTS

Figure 3:
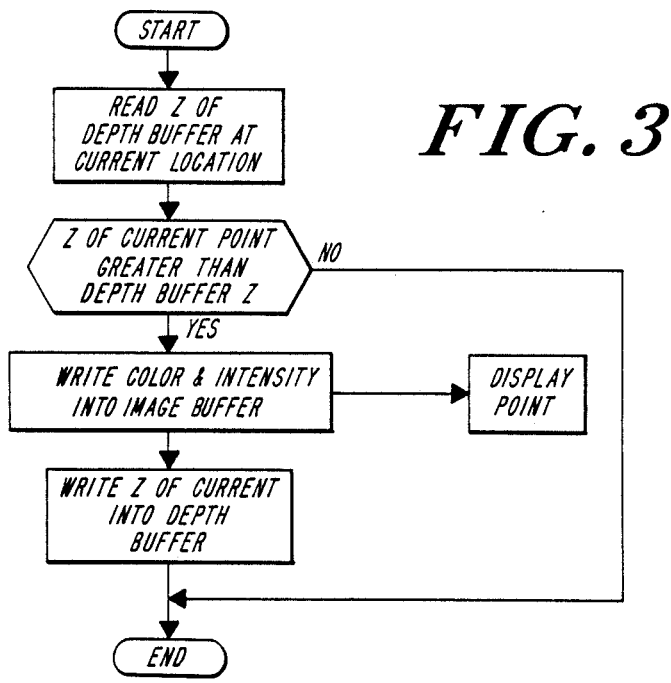
FIG. 3 shows a simplified flow chart for drawing a point of an overall image using conventional depth buffer techniques.

Referring to FIG. 2, a preferred embodiment of the system of the present invention includes a host processor 12 and a local display processor 14. The local display processor 14 is arranged to provide the functions of hidden surface removal, visible surface shading, and scan conversion, as well as the function of providing video data displaying the image points on a cathode ray tube display screen. By providing local processing of image and depth buffered data at the display processor 14, rather than at the host processor 12, the two most time consuming tasks for generating a shaded three-dimensional image can be overlapped. Thus, the host processor 21 performs the geometry transformation operation and, if necessary, a volume clipping operation, such operations being performed concurrently with the point data processing operation which is performed by the display processor 14. Thus, is no need to duplicate the entire display image at the host processor.

The host processor 12 supplies appropriate command signals to the display processor 14, as discussed in more detail below, in response to which the display processor performs the necessary operations for creating the displayed image on the CRT display 16.

Thus, for example, input data from a data base 11 defining the vertices of a geometric element, e.g. a polygon, which forms a part of the overall image to be displayed can be supplied by the host processor 12. As the host processor 12 provides data concerning the vertices of such polygon through the local display processor 14, it is suitably processed, as discussed below, for example, to provide intensity and color video data to the CRT display via a video frame buffer 18 and a color look-up table 20. The display processor 14 also processes depth data for supply to a depth or Z buffer 22, also located at the local processor 14. As the input data is so processed, the visible portions of the polygon can be immediately displayed on the raster screen of the CRT. As data concerning each subsequent polygon is transferred from the host processor 12 to the local display processor 14, the visible portions of each polygon are immediately displayed, and the overall image is incrementally built up. Such a process not only eliminates the user's anxiety while waiting for a display of some kind to appear on the screen, but also allows separate objects in the overall image to be constructed instead of constructing the entire image on a line by line basis.

In the particular embodiment shown, for example, processing of the input data in response to commands from the host processor 12 can be arranged to provide color index data with respect to the color and intensity of each point of the image for storage in the video frame buffer 18. Such index acts as a "pointer" through a specified location (address) in a color look-up-table 20 corresponding to such index which then provides the required video color (red-green-blue) data to the CRT 16 for display. Alternatively, data directly specifying the color for each image point can be stored in the frame buffer 18, and such color data can be supplied directly to the CRT 16 from the frame buffer.

In the system shown in FIG. 2, the host processor 12 performs only the viewing transformation (and volume clipping) operations on the input data and transfers such data, e.g. describing a geometric element such as a polygon, immediately to the local display processor 14 which then performs the appropriate algorithms in response to host processor commands for producing the image and depth data for each element. The display processor 14 can then immediately display the visible surface of each polygon on the screen as it is processed, while the host processor 12 is processing subsequent polygons in the overall image. Such simultaneous host processor and display processor operations proceed until the entire image which is to be displayed has been built up on an element by element (polygon by polygon), i.e. an incremental, basis. Geometric elements other than polygons which can be so processed are three-dimensional points, lines or other surfaces. The overall time needed to display an image is greatly reduced as there is no extensive waiting time before a user can see any part of the image since the image is being continuously built up substantially from the beginning when the initial geometric element is processed and displayed.

The microprocessor 24 shown in FIG. 2, which operates in combination with the video frame buffer 18 and the depth buffer 22, can be of any well-known type, such as the model Z-8000 microprocessor made and sold by Zilog Company, Cupertino, Calif., and can be appropriately programmed, in accordance with the particular processor language associated with the processor model selected, to perform the various algorithms for processing the data supplied from the host processor 12. One such algorithm provides information relating to the location, color and intensity of each point which makes up the overall image for storage in the frame buffer 18 directly as an array of image color-intensity data, or as an array of color indices for selecting the required color and intensity from a color look-up table 20. Another algorithm provides information defining the depth relationships of points at common locations on the overall image (i.e. the hidden surface information which provides a three-dimensional effect as discussed above) for storage as an array of depth data in a depth buffer 22.

Shading can be obtained by linearly interpolating data between two points supplied by host processor 12, which linearly interpolated data can then be supplied as appropriate color indices for the intervening points to the display means 16 via color look-up table 20. The latter table must be pre-loaded by the user in accordance with the user's desired color display, the table responding to the image color index data from frame buffer 18 to provide the appropriate combination of red, green and blue information to display the geometric element involved on the cathode ray tube display screen. Control of whether a particular point is actually displayed is determined by depth information stored in depth buffer 22 since processed points which are defined as "hidden" will not be displayed on the screen of display 16.

The microprocessor 24 provides the timing for producing, in a particular embodiment, for example, a 640×512 image resolution for the image and depth buffers at a 30 Hz frame rate. The frame buffer 18 can be well-known memory modules using standard chips, such as the Model 4116 dynamic memory made and sold by Motorola Company of Phoenix, Ariz. The depth buffer 22 is a dual port dynamic random access memory, for example, such as sold by Mitsubishi Electronics under designation M5M4C264P-12. In a preferred embodiment, one of the two ports is a random access port and the other port is a serial access port.

The color and shading of a particular point is determined by a 12-bit index value which is written into the frame buffer 18 for each point to be displayed. This value is used as an address input to the color look-up table 20 from the frame buffer to select from the table particular color and shades thereof at such address as pre-loaded by the user.

Depth (or "Z") values in depth buffer 22 are in the particular embodiment being described, 12-bit unsigned integers with zero representing a "background" value, i.e. a value furthest from the viewer. Each point with a depth or "Z" value larger than a previous "Z" value at the same location is considered as a visible point, and the new "Z" value is stored in the depth buffer. Subsequent "Z" values are then compared with the current "Z" value to determine which points are visible on the displayed image.

Figure 5:
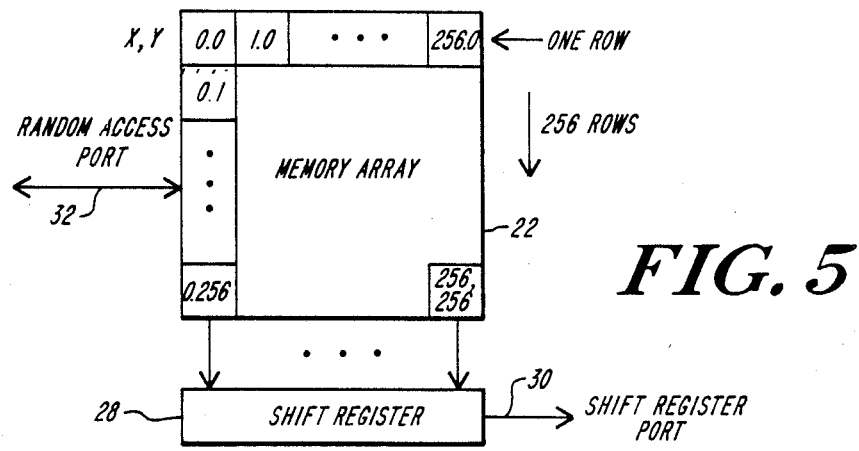
FIG. 5 is a simplified schematic diagram of the depth buffer utilized by the, system of the present invention.

In providing for the display (i.e. the drawing) of each point of the image as it is processed by the display processor 14, appropriate operations are performed by the microprocessor 24 in accordance with a simplified flow chart depicted in FIG. 3. For illustrative purposes, such flow chart depicts the simplest operation involved where it is assumed that the point to be displayed is one in which no translucent effect is to be established in a displayed image, which does not involve any change to be made from an already established zero coordinate point for the image to be displayed, which does not involve the "sectioning" of the image to be displayed, and which is to be used to provide three-dimensional effect (i.e. the point to be displayed is not merely used to provide a two-dimensional image effect). Under such conditions the contents of the depth buffer 22 at the location of the current point under consideration for display is read by performing a Read Z operation. As shown in FIG. 5, Read Z operation is performed by loading an appropriate row of the depth buffer memory array 22 into a shift register 28. The data is then read in serial fashion through the shift register port 30.

The depth value of the current point is then compared with the previously stored depth value in the depth buffer at such location. If the current point is greater than the already stored value, then the current point is in front of the previously stored point in the image to be displayed. Such comparison then conditionally permits the desired color intensity value to be written into the image buffer 18, which value can be immediately transferred to the display means via the color look-up table 20 for immediate display on the screen at the identified location with the desired color and intensity. The depth value of the current point is written into the depth buffer 22 through random access port 32 so that a subsequent point being processed at the same location on the image can be compared with it.

Figure 6:
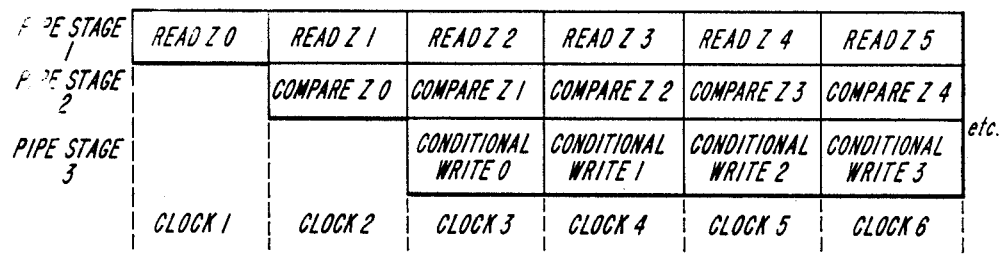
FIG. 6 shows a graphical representation of the operation of the local display processor in the system of the present invention in terms of the utilization of clock cycles.

Use of a depth buffer memory array 22 that includes a random access port 32 and a serial access port 30 that operates independently allows the depth buffering operations to be pipelined thereby greatly increasing the speed of the depth buffering operations. By pipelining operations the system uses multiple stages, each performing a different task, and passes the results onto the next stage, thereby effectively performing several operations at once as shown in FIG. 6. Since the dual port memory allows Read, Compare and Conditional Write operations to be performed during a single clock cycle, performance of the depth buffering operation is approximately three times faster than in prior art systems in which only one of these operations may be performed in a single clock cycle because of the need for access to a memory port.

If the depth value of the current point under consideration is equal to or less than the previously stored depth value in the depth buffer at such location, the current point is not displayed.

Figure 4:
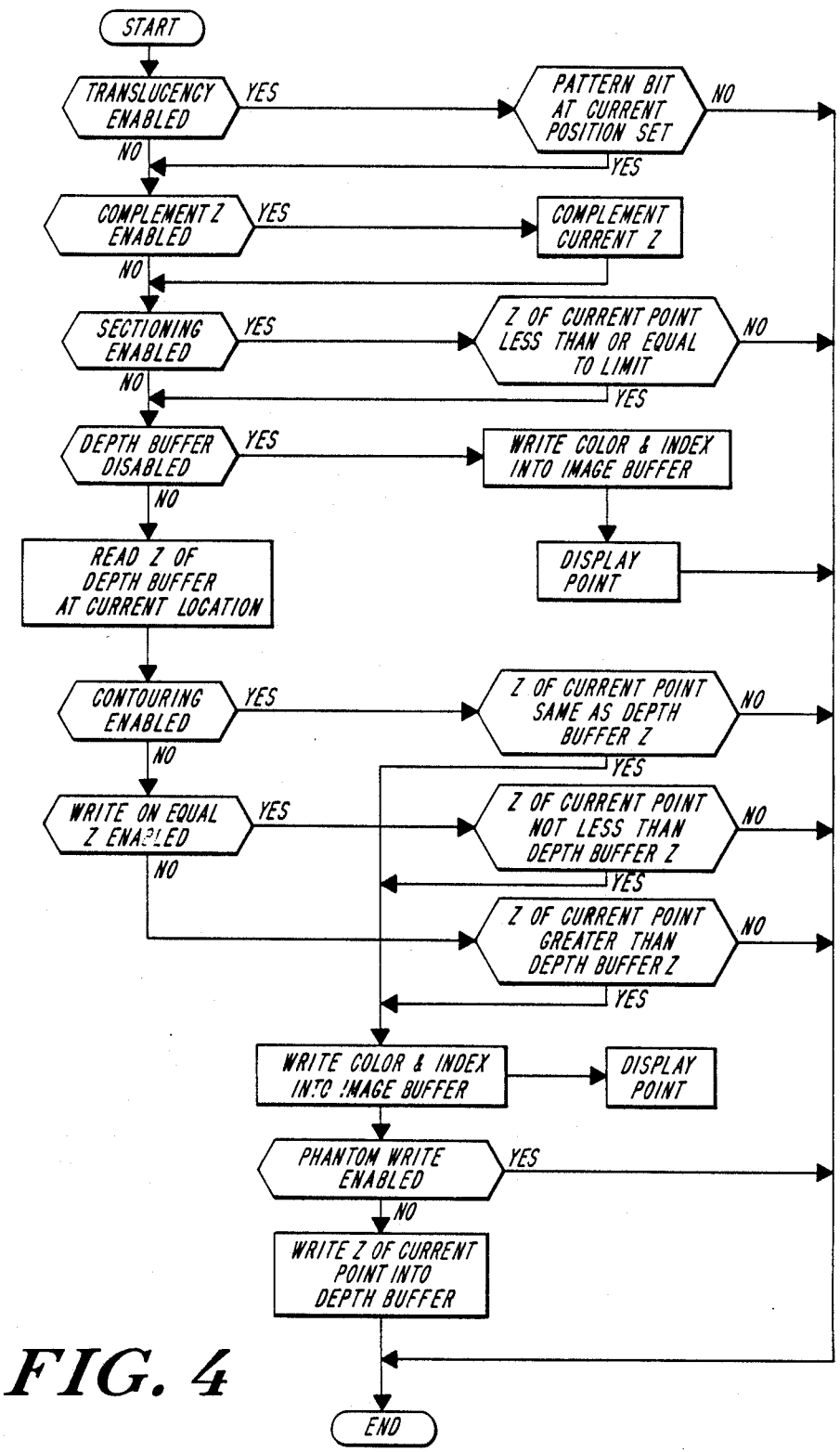
FIG. 4 shows a more complex flow chart for drawing each point of an overall image in accordance with the system of the present invention.

As can be seen from the flow chart of FIG. 4 before reading the depth buffer contents the translucency condition is first tested. Thus, if the user desires to provide a translucent image at the location of the current point under consideration, the translucency enablement (YES) overrides the reading of the depth buffer. Before drawing the point involved the translucency pattern, i.e. the degree or density of translucency must be set by the user and a determination as to whether such pattern has been set is made before proceeding with the process depicted in the flow chart. In accordance therewith the user may desire that a surface portion which normally would be hidden (all points in such portion would be eliminated and not be displayed) be made partially visible, such partial visibility providing a translucent effect in the image at the location of such portion. In such case the degree of translucency will be determined by the ratio of the number of points on such surface which are to be made visible to the number of points which are to be hidden. For example, the pattern may be such as to make half of the normally hidden points of such a surface portion visible and to make half of the points hidden. Accordingly, before proceeding with a decision to display or not display the points on such surface the processor must determine whether a translucency effect is to be established and, if so, must determine that the translucency pattern (the "degree" thereof) is set.

If the translucency pattern is so set, or if translucency is not to be enabled at all, the next condition examined is whether the currently established zero point for the coordinate system used for the image display is to be changed or not. Normally, the coordinate zero depth point is at the back plane of the image. However, in some cases the user may desire that the front plane of the image be used as a zero depth point (sometimes referred to as the complement depth). The processor accordingly determines whether the normal zero depth is to be used or whether the complement depth is to be enabled.

Once the zero depth point is defined, either by enabling the complement or using the conventional back plane zero depth, the next condition to be examined is whether the point currently being considered is in a portion of the image which represents a "sectioning" of the image. If sectioning is to occur ("Sectioning Enabled" is YES), the current point is examined to see if its depth value is less than or equal to the depth limit of the section being taken. If less than or equal to such limit, the current point is a candidate for display, while if it is not less than or equal to such limit, it is not displayed and examination thereof ends.

The next condition examined is whether a two-dimensional image is to be displayed. In the former case the depth buffer is simply disabled (YES) (since depth information has no significance) and the current point is written into the image buffer and can be immediately displayed on the display screen via the color look-up table. If, on the other hand, a three-dimensional image is required, the depth buffer is not disabled (NO) and the contents thereof are read at the location of the current point under consideration, as discussed above, to determine whether the current point is a visible one or not.

At such stage, once the contents of the depth buffer at the current point are read, a determination is made as to whether the current point intersects with a previous point at the location involved and, if so, whether the current point should also be displayed together with the previous point so that the intensity at that location is accordingly emphasized ("contouring"). If both intensity points at an intersection are to be displayed (contouring enabled is YES) a determination must be made as to whether the current point is at the same depth as the previous point stored at such location in the depth buffer and, if it is not, further examination of the current point ends. If it is, the current point is then displayed via the color look-up table.

If no "contouring" is required one further condition is examined to determine whether the current point under examination should be displayed if it is either equal to or greater than the depth of the point presently stored in the depth buffer at the location in question. If so (YES), the depth (Z) value of the point is compared with the depth buffer value and if it is not less than the latter the currently examined point is displayed. If it is less than the latter, no further examination of such point is made.

If the current point is to be displayed only when it is greater than the depth (Z) value of the depth buffer (a normal condition for most three-dimensional images), the value of the current point under examination is compared with the depth value previously stored in the depth buffer at the location in question and, if greater than the latter value, it is displayed via the color look-up table 20. If not, examination of the current point ends, and it is not displayed.

When the current point is displayed, a decision must further be made as to whether its depth value is to be stored in the depth buffer at the location involved. In some cases (as when a "cursor" point is being displayed) the current point may be displayed but its depth value is not stored in the depth buffer, in which case it is treated as a "phantom" point (effectively a temporarily displayed point only). If it is not to be treated as a phantom, or non-stored, point, its depth value is written into the depth buffer at the location in question.

While the foregoing invention has been described with reference to its preferred embodiments, various modifications and alterations will occur to those skilled in the art. All such modifications and alterations are intended to fall within the scope of the appended claims.

What is claimed is:

1. A system for use in displaying a three-dimensional representation of an image on a two-dimensional display means, said system comprising:

host processor means responsive to input data from a data base source defining said image for generating host data representing one or more three-dimensional geometric elements comprising said image to be used for display on the display means;

display processor means responsive to said host data for providing output data for use by the display means;

said display processor means including means responsive to host data defining selected points of said geometric elements for determining the depth relationships of points required to form said displayed image and to obtain depth data for those points which are to be displayed as visible points in said image and to obtain image data defining the color and intensity corresponding to said visible points in said image;

means for storing depth data for those points determined as visible points, and means for storing image data corresponding to said visible points, said means for storing depth data including at least one random access port through which said output data is provided and at least one serial access port through which said input data is received by said display processor means, said display processor means providing said output data through said random access port at the same time it receives said input data through said serial access port; and means responsive to said stored image data for supplying said stored image data as output for use by the display means for displaying thereon the visible points required to produce a three-dimensional representation of said image.

2. The system in accordance with claim 1 wherein said serial access port comprises a shift register connected to said means for storing depth data and a shift register port connected to said shift register.

3. The system in accordance with claim 2 wherein said shift register contains a number of memory locations greater than or equal to the number of memory locations in a row of said means for storing depth data.

4. The system in accordance with claim 3 further comprising means for loading a row of memory locations from said means for storing depth data into said shift register.

5. A system in accordance with claim 1 wherein the means for determining said depth relationships to obtain said depth data and said image data is a microprocessor means.

6. A system in accordance with claim 5 wherein said display processor means provides current output data for use by a raster display means directly from said image storing means while further host data is being supplied from said host processor to said display processor means.

7. A system in accordance with claim 6 wherein said depth data storing means comprises a depth buffer means and said image data storing means comprises a frame buffer means.

8. A system in accordance with claim 7 wherein said frame buffer means stores color and intensity values which can be directly supplied for use by said raster display means.

9. A system in accordance with claim 7 wherein said frame buffer means stores color index values relating to said image data, said system further including color look-up table means for storing color and intensity values and responsive to said color index values for supplying color and intensity values which can be supplied for use by said raster display means.

10. A system in accordance with claim 9 wherein said output data is supplied as video output data for use by a cathode ray tube video display means.

11. A system in accordance with claim 9 wherein said microprocessor means includes means for determining the depth value at a selected point corresponding to each currently processed point of said image relative to the depth value previously stored in said depth data storing means at said selected point.

12. A system in accordance with claim 11 wherein said determining means includes:

means for reading the depth value at said selected point from said depth buffer means and through said serial access port;

means for comparing the depth value of a currently processed point corresponding to said selected point with the depth value read from said depth buffer means and through said serial access port at said selected point; and means responsive to said comparison for writing the color index values of currently processed points which are determined as visible points into said storing means through said random access port.

13. A system in accordance with claim 1 wherein said means for determining depth relationships determines such depth relationships at the same time said display processor means provides data through said random access port or receives data through said serial access port.

* * * * *